(12) United States Patent
Nagatoshi

(10) Patent No.: US 6,795,247 B2
(45) Date of Patent: Sep. 21, 2004

(54) OPTICAL INSTRUMENT FOR OBSERVATION

(75) Inventor: Yukiko Nagatoshi, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 7 days.

(21) Appl. No.: 10/339,294

(22) Filed: Jan. 10, 2003

(65) Prior Publication Data
US 2003/0142404 A1 Jul. 31, 2003

(30) Foreign Application Priority Data
Jan. 29, 2002 (JP) ........................ 2002-019768

(51) Int. Cl.$^7$ .............. G02B 27/64; G02B 5/04
(52) U.S. Cl. .......... 359/557; 359/554; 359/555; 359/831; 359/431; 359/795
(58) Field of Search .............. 359/431, 554, 359/555, 557, 795, 831, 834, 556, 835, 836

(56) References Cited

U.S. PATENT DOCUMENTS 2,456,521 A * 12/1948 Maxwell .................... 359/431
4,235,506 A    11/1980 Saito et al.
5,166,820 A * 11/1992 Fujita ....................... 359/211
6,476,983 B2 * 11/2002 Kodama et al. ............ 359/795

FOREIGN PATENT DOCUMENTS

JP        H6-250100        9/1994

* cited by examiner

Primary Examiner—Audrey Chang
(74) Attorney, Agent, or Firm—Arnold International; Bruce Y. Arnold

(57) ABSTRACT

An optical instrument for observation includes, in order from the object side, an objective lens system having positive refractive power, an erecting optical system, and an ocular lens system having positive refractive power. When an anti-vibration mechanism is used to maintain the erecting prism at an orientation in space that is stabilized so as to prevent image degradation due to vibrations of the optical instrument for observation, the erecting prism is constructed to satisfy specified conditions so that ghost light is not generated and so that the optical instrument for observation may be compact.

7 Claims, 7 Drawing Sheets

OPTICAL INSTRUMENT FOR OBSERVATION

BACKGROUND OF THE INVENTION

Optical instruments such as binoculars and telescopes which include an objective lens and an ocular lens have been known. When both the objective lens and the ocular lens are constructed so as to have positive refractive power, an inverted image is formed. In astronomical telescopes this is acceptable. However, in binoculars and terrestrial telescopes, an erecting optical system is placed between the objective lens and the ocular lens in order that the observer can observe an erect image. For example, the erecting optical system often includes an erecting prism, as used in so-called prism binoculars. More particularly, it is common to use a so-called Schmidt erecting prism in the erecting optical system when making compact binoculars.

FIGS. 7(A) and 7(B) show an optical system of a prior art optical instrument for observation that uses a Schmidt prism to form an erect image. This optical system is provided with a positive objective lens 110, an erecting optical system 130 and a positive ocular lens 120. Moreover, the position "111" on the optical axis Z1 represents the axial position of an image that is formed by the objective lens 110, and "E. P." represents the pupil position for observation (eye point).

As shown in FIGS. 7(A) and 7(B), the erecting optical system 130, termed a Schmidt prism, is actually formed of two prisms, namely, a first prism 131 and a second prism 132 which are almost touching but are separated by a small air gap. The first prism 131 has three reflecting, planar surfaces that are active, namely, surfaces 131A, 131B, and 131C. The second prism 132 is a roof prism and has a roof surface 132C formed of two reflection surfaces that are perpendicular to each other. The second prism 132 has three reflecting, planar surfaces that are active, namely, surfaces 132A, 132B and the roof surface 132C.

In an optical instrument for observation having such an optical system, light emergent from the positive objective lens 110 is first incident upon the surface 131A of the erecting prism 130, at which point it is transmitted. Then the light undergoes total internal reflection at the surface 131B and is directed to the surface 131C, where it again undergoes total internal reflection. When the light is again incident onto surface 131B, its incident angle is less than that required for total internal reflection, and so the light is transmitted. Thus, the light is transmitted through surface 131B and is incident onto the surface 132A of the second prism 132.

The light incident upon the second prism 132 undergoes total internal reflection at the surface 132B, is reflected by a mirror at surface 132C, and undergoes total internal reflection at surface 132A, and then is emergent from the surface 132B and is transmitted to the ocular lens 120. The inverted image that would normally be formed by the positive objective lens 110, by the action of the erecting prism 130, is converted to an erect image. This erect image is then observed by the ocular lens 120.

When a Schmidt erecting prism 130 is used to erect an image, there is a problem in that ghost light, as will be explained below, may be generated. Namely, as shown in FIGS. 7(B) and 8, light 140 that is incident upon the first reflection surface (i.e., the surface 131B of first prism 131) at an angle θ1 (FIG. 8) that is smaller than the critical angle (the angle required for total internal reflection) is transmitted by the first reflection surface and is emergent from the first prism 131 without being reflected by the first prism 131. Subsequently, this light then passes through the second prism 132 and the ocular lens 120 and appears as ghost light that deteriorates the quality of the image seen by the observer.

In optical instruments for observation, such as monoculars and binoculars, if a vibration occurs so as to deviate the optical axis of an optical instrument for observation from the viewing direction, an angular deflection of the light rays occurs. Thus, the quality of an observed image may be greatly degraded, especially in the case where the image is observed with a high magnification. Various anti-vibration mechanisms have been proposed for optical instruments in order to prevent the angular deflection of light rays from an observed object due to a vibration. For example, a mechanism has been disclosed which maintains the spatial orientation of an erecting optical system, such as the so-called Schmidt prism 130, substantially constant despite a vibration or sudden change in the direction of the optical axis of the optical instrument.

However, ghost light is particularly troublesome in an optical system that has been provided with such an anti-vibration or image-stabilizing mechanism. In such an optical system, the spatial orientation of an erecting optical system, such as the Schmidt prism 130, is maintained constant during a vibration while the objective lens 110 and the ocular lens 120 are rotated by the vibration relative to the Schmidt prism 130. When the optical system rotates as a result of a vibration or sudden change in the direction of the optical axis of the optical instrument, the objective lens 110 receives light that originally was outside the effective diameter of the objective lens 110. Some of this light may not undergo total internal reflection in the Schmidt prism, such as at surface 132A, and will produce ghost light that will degrade the quality of the observed image.

BRIEF SUMMARY OF THE INVENTION

The present invention relates to an optical instrument for observation which uses an inverting optical system (erecting system) for forming an erect image, and more particularly, relates to an optical instrument for observation such as binoculars or a telescope, etc., that is provided with an anti-vibration mechanism. In particular, the present invention relates to an optical instrument for observation which can prevent the occurrence of ghost light.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
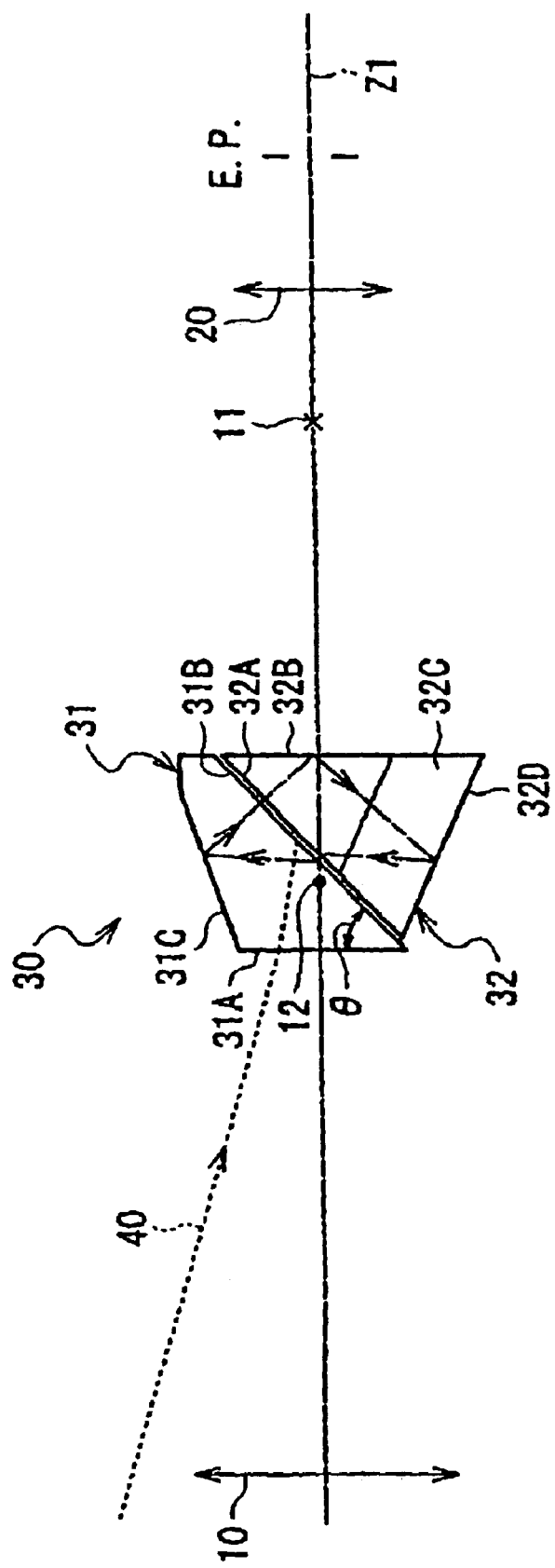
FIG. 1 is a schematic diagram of the optical system of an optical instrument for observation that relates to an embodiment of the present invention.

The present invention is an optical instrument for observation that includes, in order from the object side, an objective lens system having a positive overall refractive power, an erecting optical system, and an ocular lens system having a positive overall refractive power, and in which an anti-vibration mechanism maintains the spatial orientation of the erecting optical system substantially constant in space despite the occurrence of vibrations which change the direction of the optical axis Z1 of the optical instrument. According to a first feature of the invention, the following Condition (1) is satisfied:

$$0.25 < L/fo \cdot \sin \omega < 0.5 \qquad \text{Condition (1)}$$

where

L is the distance from the lens element surface nearest the object side of the objective lens system to the erecting prism, fo is the focal length of the objective lens system, and ω is the maximum angle of rotation of the erecting prism relative to the optical axis Z1 of the optical instrument in order to maintain the spatial orientation of the erecting prism substantially constant in space when correcting for sudden changes in orientation of the optical axis Z1.

In the present invention, an object image that would ordinarily be formed inverted by an objective lens system having positive overall refractive power is instead converted to an erect image by the operation of the erecting optical system. The erect image is then observed by the ocular lens system. By use of an anti-vibration mechanism, the spatial orientation of the erecting optical system is maintained at substantially an initial orientation in space during a vibration that causes the optical axis of the optical instrument to change its orientation.

During a vibration, an erecting optical system is rotated relative to an optical axis that connects the objective lens system and the ocular lens system by an anti-vibration mechanism.

By satisfying the above Condition (1), the occurrence of ghost light is diminished as compared with the case of not satisfying Condition (1). Moreover, the greater the distance L, the less likely ghost light will degrade the image. However, this causes the overall length of the optical instrument to increase. Thus, by satisfying Condition (1), a proper balance is maintained between compactness of the optical instrument and the occurrence of ghost light.

According to a second feature of the present invention, it is desirable that the optical erecting prism be a so-called Schmidt prism, which actually is formed of two prisms, a first prism on which the light is initially incident, and a second prism which receives output light from the first prism, and that the following Conditions (2) and (3) are satisfied:

$$\theta \geq 47° \qquad \text{Condition (2)}$$

$$np1 \geq 1.6 \qquad \text{Condition (3)}$$

where

θ is the apex angle of the first prism as measured between the first incident surface of light entering the prism and the next surface the light is incident upon; and np1 is the index of refraction of the first prism.

By satisfying Conditions (2) and (3), ghost light will be prevented, in that all the light that is incident onto the first reflection surface will be totally internally reflected at the first reflection surface.

According to a third feature of the invention, it is desirable that the objective lens system be constructed of, in order from the object side, a first lens group having positive refractive power and a second lens group having negative refractive power, and that the objective lens system be constructed so as to satisfy the following Condition (4):

$$0.5 < fo1/fo < 0.9 \qquad \text{Condition (4)}$$

where fo is the focal length of the objective lens system, and fo1 is the focal length of the first lens group of the objective lens system.

Condition (4) ensures a proper power distribution among the first lens group of the objective lens system as compared with the entire objective lens system. If the lower limit of Condition (4) is not satisfied, correction of spherical aberration of the first lens group will become difficult. If the upper limit of Condition (4) is not satisfied, the overall length of the optical instrument for observation will be such that compactness will be lost.

Satisfying Condition (4) enables the spherical aberration to be well-corrected while ensuring that the overall length of the optical instrument is not excessive. Furthermore, it is desirable that the second lens group of the objective lens system be movable along the optical axis for focus adjustment.

The invention will first be described in general terms with reference to the drawings.

Figure 2:
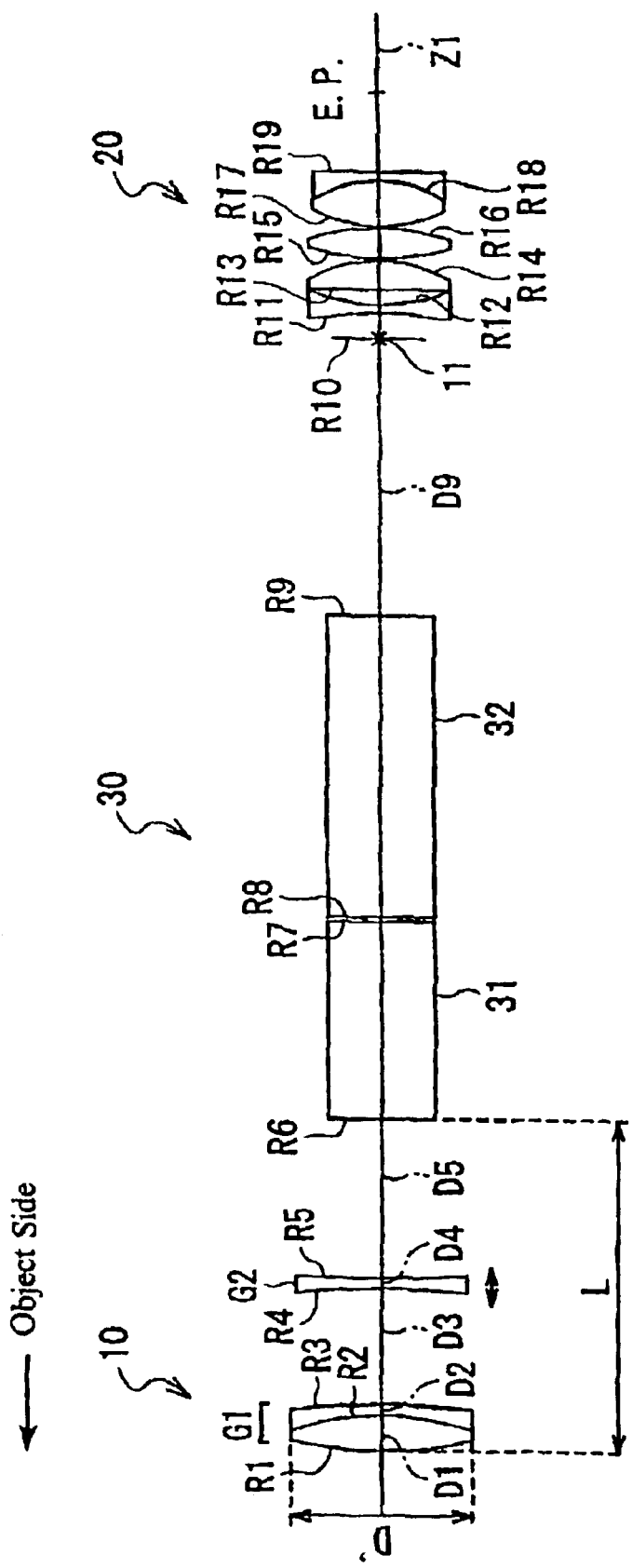
FIG. 2 is a sectional view of the general lens element configuration as proposed in the first and second embodiments of the invention.

FIG. 1 is a schematic diagram of the optical system of an optical instrument for observation according to the present invention. FIG. 2 shows a representative lens element configuration of the present invention. As mentioned previously, the present invention solves a problem that arises when an optical instrument for observation, that includes a positive objective lens 10, an erecting prism 30 (such as used in binoculars or a telescope for terrestrial observations) and a positive ocular lens 20, is provided with an anti-vibration mechanism.

Such an anti-vibration mechanism maintains the erecting prism 30 at an initial orientation in space despite sudden small changes in orientation (herein termed a vibration) which results from instability in directing the optical instrument at a viewed object. In FIGS. 1 and 2, the position of item 11 is the axial position of the image that is formed by the objective lens 10, and E. P. (eye point) represents the viewing pupil (i.e., the conjugate image that is formed by the ocular 20 of the image at 11. In FIG. 1, the dot at item 12 is the center of rotation of the erecting prism 30 when moved by the anti-vibration mechanism so as to stabilize an image.

Figure 5:
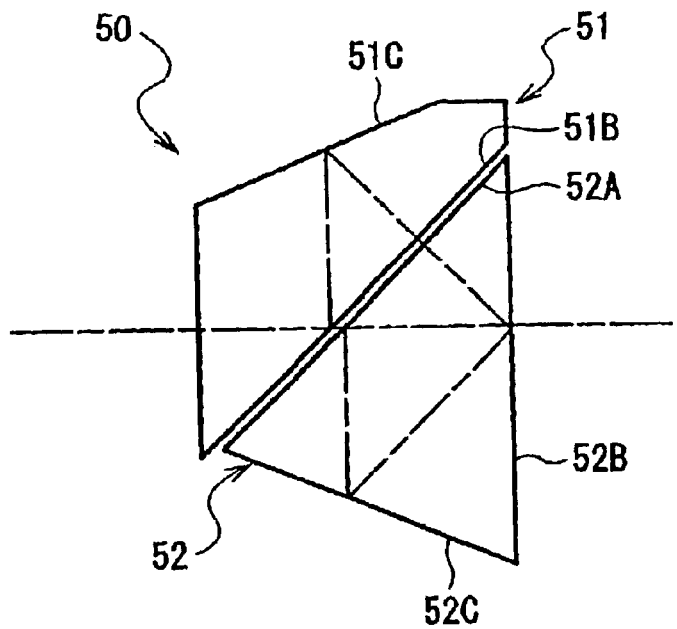
FIG. 5 is a block diagram showing a Schmidt (sometimes termed a Pechan) prism.

The objective lens 10 may be constructed as illustrated in FIG. 2. In order from the object side, the objective lens 10 of FIG. 2 is formed of a first lens group G1 of positive refractive power and a second lens group G2 of negative refractive power. At least a portion of the objective lens 10 is movable along an optical axis Z1 for focus adjustment as, for example, the movement of the second lens group G2 as indicated by the double-headed in FIG. 2. The erecting prism 30 has a function of erecting an inverted image that is formed by the objective lens 10. The erecting prism 30 may be what is termed a Schmidt erecting prism but is actually formed of two prisms, namely, a first erecting prism 31 and a second erecting prism 32. The operation of a "so called" Schmidt (sometimes termed a Pechan) erecting prism will now be described. As shown in FIG. 5, two prisms, such as a wedge-type prism 51 having two reflection surfaces 51B, 51C and with an angle of about 45° between these surfaces and an isosceles triangle prism 52 having three reflection surfaces 52A, 52B, 52C and an apex angle of about 45°, are combined so as to have a small air space separating the prisms. As used herein, a combination of two prisms arranged with a small air space separating the prisms, and in which a roof surface is provided either in the wedge-type prism 51 or in the isosceles triangle prism 52 is called a "Schmidt erecting prism".

Figure 6A:
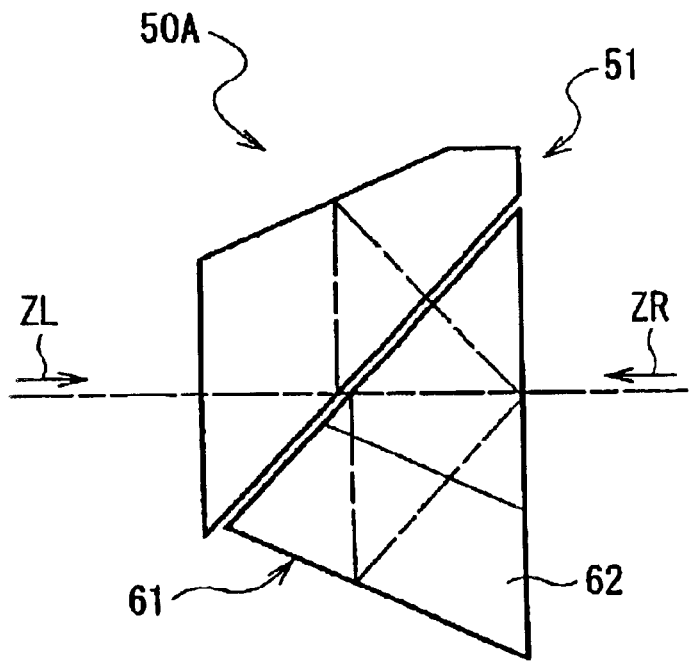
FIGS. 6(A) and 6(B) are block diagrams showing a Schmidt erecting prism.
Figure 6B:
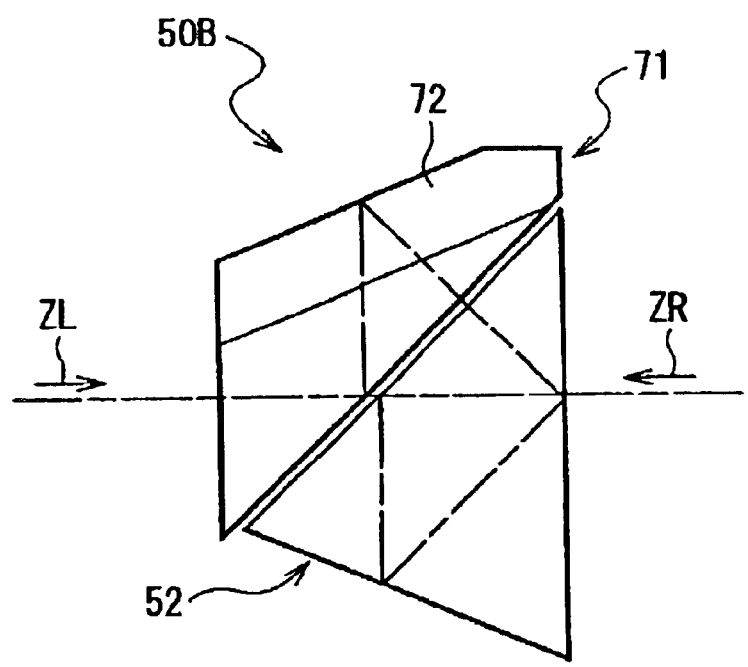

For example, Schmidt erecting prisms are shown in FIGS. 6(A) and 6(B). The combination of prisms shown in FIG. 6(A) is an example of combining a roof prism 61 with a wedge-type prism 51. The roof surface 62 here is provided roof prism 61. The Schmidt erecting prism 50B shown in FIG. 6(B) is an example of combining an isosceles triangle prism 52 and a wedge-type prism 71 that includes a roof surface 72 in lieu of, for example, the wedge surface 51C shown in FIG. 5. These Schmidt erecting prisms 50A, 50B function to invert an image whether the incident light travels in the direction indicated by the arrow ZL (entering from the left side) or whether the incident light travels in the direction indicated by the arrow ZR (entering from the right side).

FIG. 1 illustrates the incident light onto the erecting prim 30 traveling in the same direction as the light ZL that is incident from the left onto the prism 50A in FIG. 6(A). In this erecting prism 30, the first prism 31 has three surfaces 31A, 31B, 31C that are operative on the light. Incident light first strikes the surface 31A and is transmitted. Surfaces 31 and 31C act to reflect the light that is initially incident thereon, but the surface 31B acts to transmit the light that reflects from surface 31C, since it is incident at less than the critical angle. The second prism 32 is a roof prism and has a roof surface 32C constructed with two reflection surfaces perpendicular to each other. The line 32D is the ridge line of the roof surface 32C. In addition to the roof surface 32C that acts on the incoming light, the second prism 32 has two optical surfaces 32A, 32B that act on the incoming light by reflecting it. The prisms 31 and 32 are arranged so that the surface 31B and the surface 32A face each other with a small air space between the surfaces. It is desirable that the erecting prism 30 be so constructed as to satisfy the above Conditions (2) and (3).

Figure 7A:
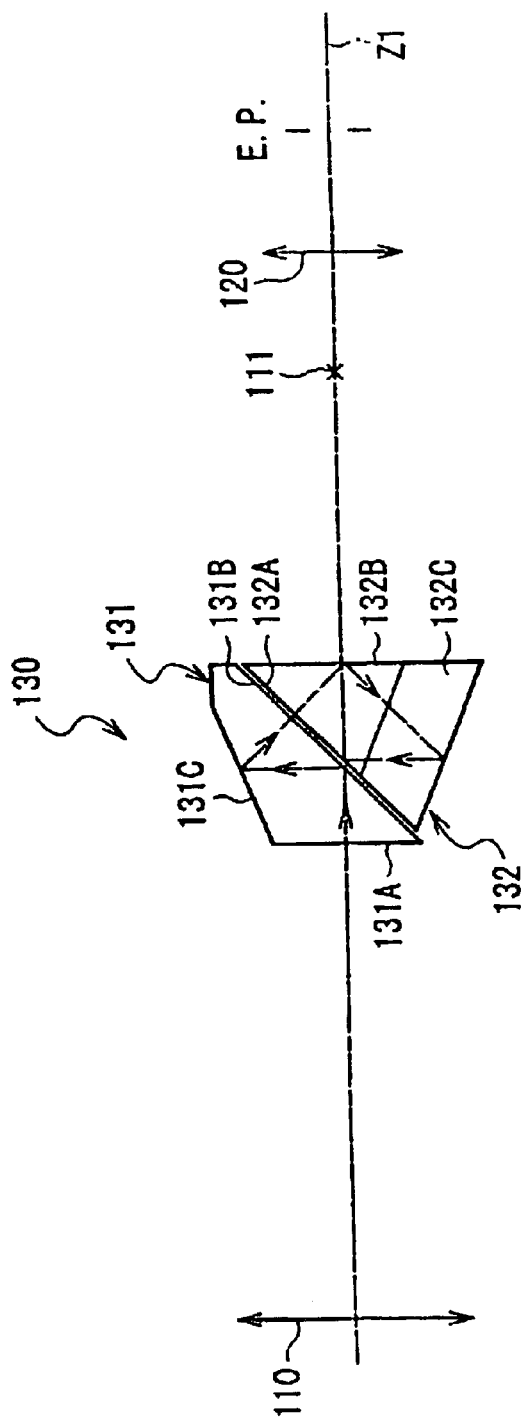
FIGS. 7(A) and 7(B) are schematic diagrams showing the construction of an optical system of a conventional optical instrument for observation using a Schmidt erecting prism.
Figure 7B:
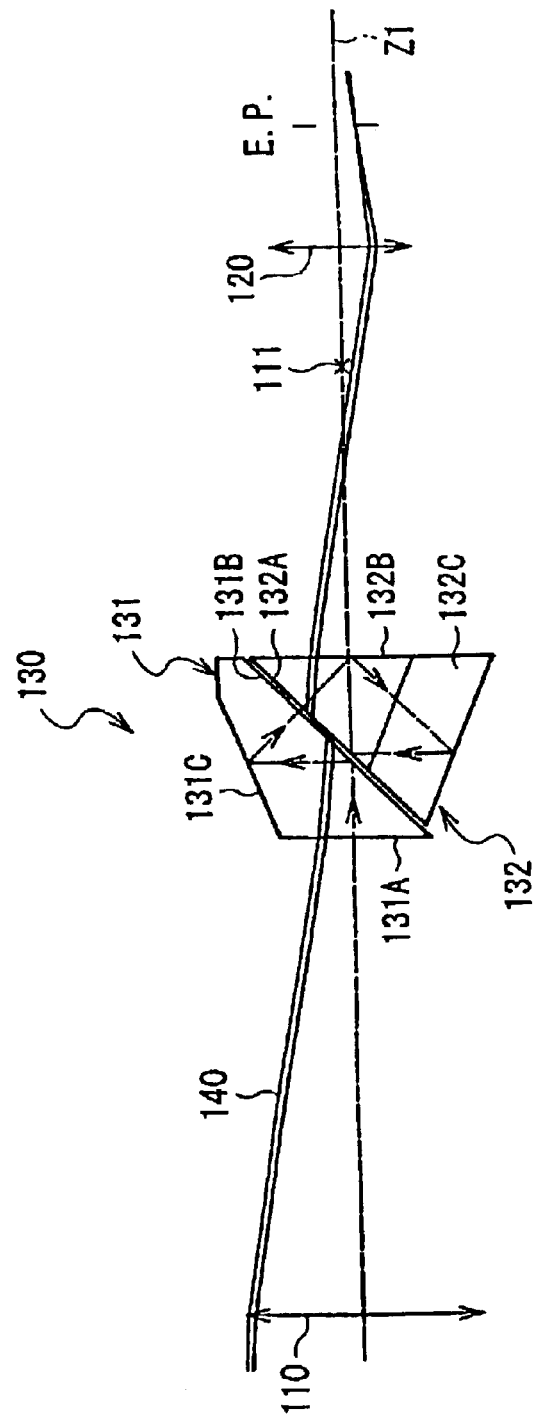
Figure 8:
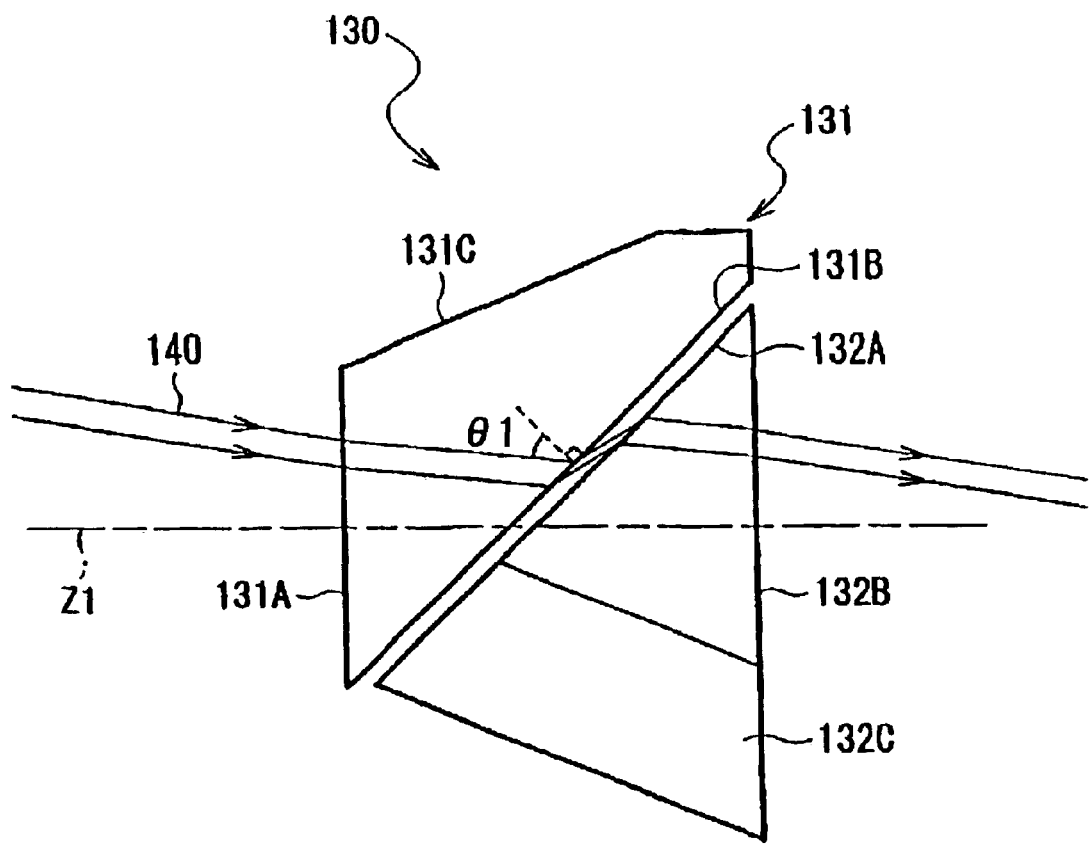
FIG. 8 is an illustrative diagram of the manner in which ghost light is generated in a conventional optical instrument for observation.

In FIG. 1, the light ray 40 shown by a dotted line represents a light ray which is incident upon the first reflection surface (surface 31B) of the first prism 31 at the limit of the critical angle for total internal reflection at the surface 31B. Therefore, a light ray 40 passing through the objective lens 10 will be totally internally reflected when first incident onto the surface 31B and ghost light, as shown in FIGS. 7(B) and 8, does not occur.

Although not illustrated in FIG. 1, an anti-vibration mechanism maintains the orientation of the erecting prism 30 stabilized in space so as to stabilize the observed image from being deflected as a result of rotary vibrations of the optical instrument for observation. For example, an anti-vibration mechanism that utilizes a rotary inertial body for image stabilization or that uses an anti-vibration mechanism having a direction detection means which controls a driving means for image stabilization are conventional techniques used by anti-vibration mechanisms to stabilize an image. Moreover, an image stabilization device as described in Japanese Laid-Open Patent Application H6-250100 can be used.

The operation of the optical instrument for observation according to the present invention will now be described, with reference to FIG. 1, wherein light emergent from the positive objective lens 10 is incident upon the erecting prism 30. Light incident upon the erecting prism 30 is transmitted at the surface 31A of first prism 31, and is then incident onto the surface 31B for a first time at an incidence angle that is greater than the critical angle (as measured from the normal to the surface). Thus, the light undergoes total internal reflection at the surface 31B and is directed towards the surface 31C. The light incident upon the surface 31C is reflected so that the light is again incident onto the surface 31B, where its incidence angle is now less than the critical angle. Thus, this time the light transmits through the surface 31B and is then incident upon the surface 32A of the second prism 32.

Light incident upon the second prism 32 is transmitted at its first incidence onto surface 32A, and is then reflected at the surfaces 32B, 32C and 32A so that it is incident onto surface 32B, which transmits it to the ocular lens 20. What would normally be an inverted image at position 11 that is formed by the objective lens 10 of an object is converted by the roof surfaces 32C of the Schmidt erecting prism 30 into an erect image. The lens 20 creates a virtual magnified image of the erect image at 11 (which also is erect) and which may be viewed by an observer placing his eyes at the Eye Point E. P.

Figure 3:
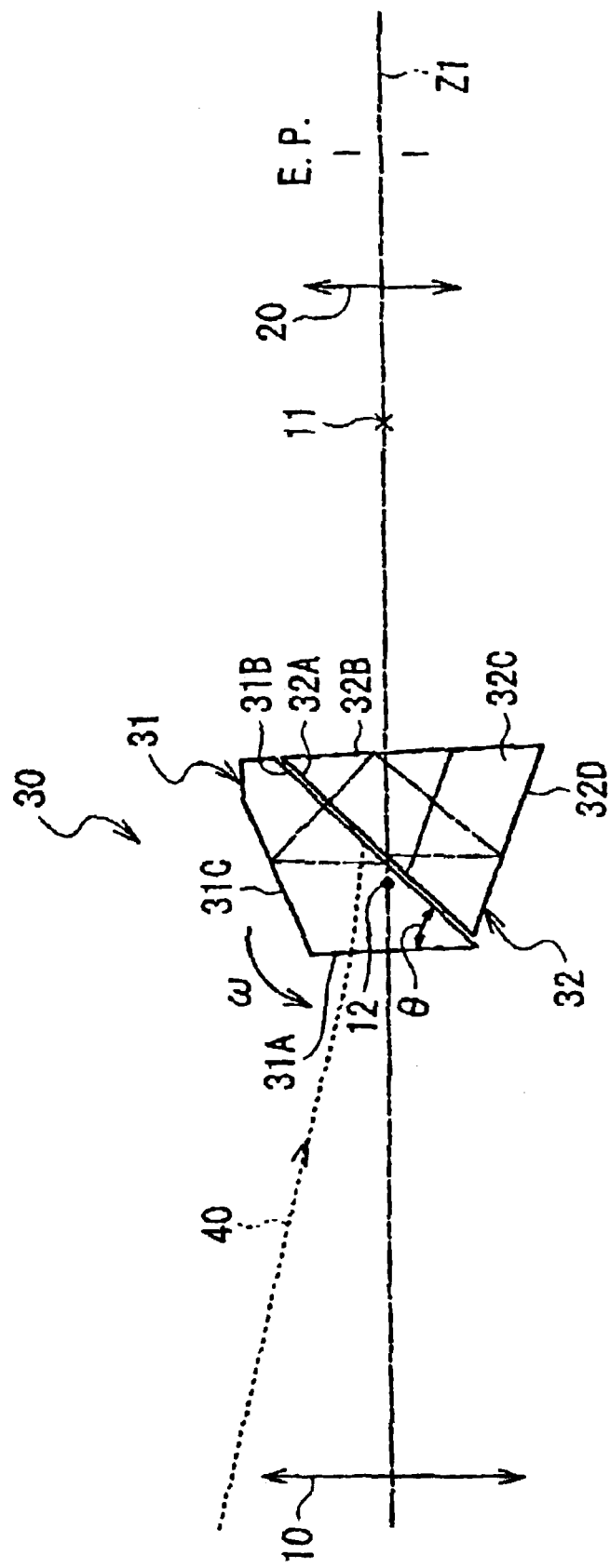
FIG. 3 is a schematic diagram showing a state wherein an erecting prism of an optical system of an optical instrument for observation as shown in FIG. 1, has been rotated.

In this optical instrument for observation, the spatial orientation of the erecting prism 30 is stabilized by an anti-vibration mechanism, so as to prevent image degradation which occurs if the optical axis of the observing optical system itself is subject to angular motions, which causes light rays passing through the optical instrument for observation to be deflected. As shown in FIG. 3, to correct for sudden angular motions, the erecting prism is rotated by an anti-vibration mechanism so as to maintain a constant orientation in space. This causes its orientation relative to the objective lens 10 and the ocular lens 20 to be changed. Condition (1) is to ensure that ghost light is prevented even when the erecting prism 30 rotates in this way.

Referring to FIG. 2, in this optical instrument for observation a small distance L means that the total length of the optical instrument for observation becomes compact. However, if the distance L is decreased such that the objective lens 10 approaches near the erecting prism 30, the objective lens 10 will easily accept light that is outside the light ray 40 in FIG. 1, due to the spatial orientation of the erecting prism 30 having been rotated an amount ω in the direction of the curved arrow as shown in FIG. 3. On the other hand, the greater the distance L, the more the surface on the object side of the objective lens 10 is apart from the erecting prism 30, and it becomes less likely that light will be first incident onto the prism surface 31B at less than the critical angle such that the light is transmitted and becomes ghost light. Thus, compactness of the optical instrument for observation is secured while avoiding the formation of ghost light by satisfying Condition (1), even if the erecting prism 30 is rotated by an anti-vibration mechanism in order to stabilize the image.

Referring again to FIG. 2, whether ghost light is created depends not only on the distance L and the maximum amount of rotation ω of the erecting prism by an anti-vibration means, but also on the diameter D' of the objective lens. If the objective lens diameter D increases, this increases the likelihood that ghost light will occur. Accordingly, it is desirable that the following Condition (5) also be satisfied:

$$0.2 < D'/2L + \tan \omega < 0.35 \qquad \text{Condition (5)}$$

where

D', L and ω are as defined above.

If the upper limit of Condition (5) is exceeded ghost light becomes a problem. On the other hand, if the lower limit of Condition (5) is not satisfied, although ghost light is not generated, the objective diameter becomes unnecessarily large and the observing optical system will no longer be compact.

Conditions (2) and (3) ensure that the light that is first incident onto the surface 31B will be totally internally reflected.

Figure 4:
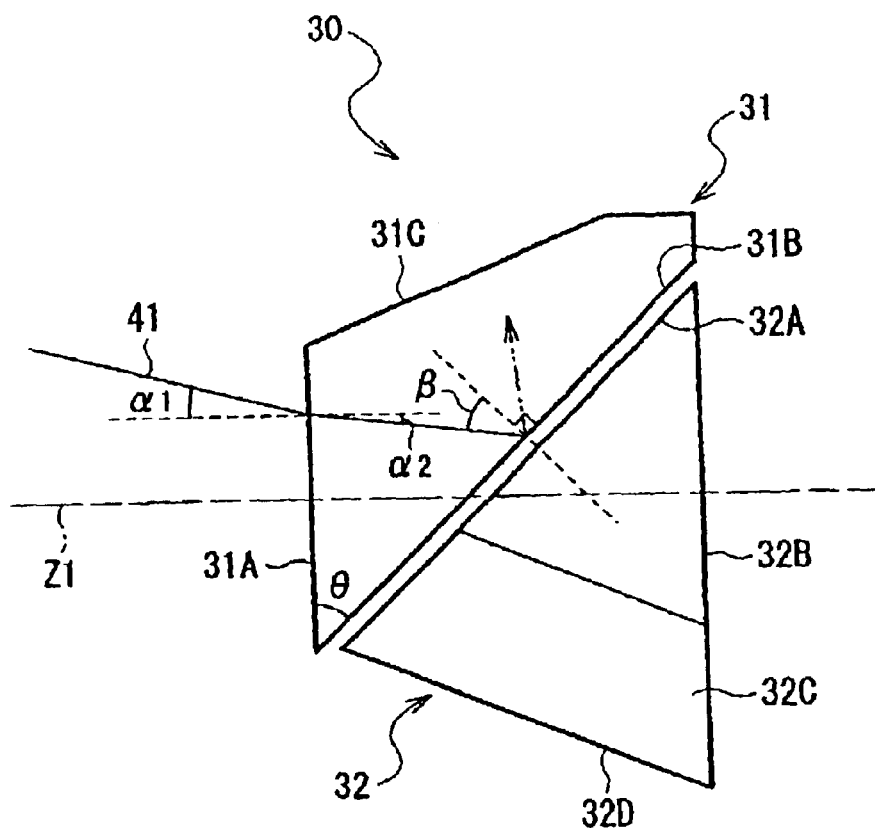
FIG. 4 is an enlarged view of an erecting prism in an optical system of an optical instrument for observation as shown in FIG. 1.

Referring to FIG. 4, for total internal reflection to occur when the ray 41 is first incident onto the surface 31B, the following Condition (A) must be satisfied:

$$\beta > \sin^{-1}(1/n) \qquad \text{Condition (A)}$$

where

β is the angle of incidence of the light ray onto the surface 31B, as measured from the surface normal, and n is the refractive index of first prism 31.

Condition (A) can be expressed as the following Condition (B), using the facts that $\beta = \theta - \alpha_2$ and that $\sin \alpha_1 = n \sin \alpha_2$:

$$\theta - \sin^{-1}(\sin \alpha_1/n) > \sin^{-1}(1/n) \qquad \text{Condition (B).}$$

From Condition (B), it is known that total internal reflection more easily occurs when the values of θ or n are increased. When total internal reflection occurs at the surface 131B, no light that is first incident the surface 131B is transmitted, as shown in FIG. 7(A). For example, when θ equals 47° and np1 equals 1.648, the light 140 that is incident upon the reflection surface 131B of the first prism 131 at the critical angle (i.e., the very limit for total internal reflection) is easily outside the effective diameter of the objective lens 110. Therefore no ghost light occurs.

On the other hand, for example, when the angle θ=45° and the refractive index np1=1.569, the light 140 incident at the critical angle easily comes within the effective diameter of the objective lens 110 and is incident upon the erecting prism 130; thus ghost light occurs, as shown in FIG. 7(B).

In the optical instrument for observation according to the present invention, light is diverged by the second lens group G2 (FIG. 2) since this lens group has negative refractive power. Therefore, an angle at which the light is incident upon the first reflection surface of the erecting prism 30 easily becomes greater than the critical angle and ghost images are prevented from appearing. Moreover, the total length of the optical instrument for observation can be made compact relative to the focal length fo of the objective lens 10.

Next, two embodiments of an optical instrument for observation will be set forth in detail.

Embodiment 1

As mentioned above, FIG. 2 shows the general lens element configuration for this embodiment.

Table 1 below lists the surface number #, in order from the object side, the radius of curvature R (in mm) of each surface, the on-axis spacing D (in mm) between surfaces, as well as the index of refraction $N_d$ (at the d-line, i.e., λ=587.6 nm) of each optical element of the optical instrument for observation of Embodiment 1. In the bottom portion of the table are listed various values that relate to Conditions (1)–(5) above.

TABLE 1

| # | R | D | $N_d$ |
|---|---|---|---|
| 1 | 75.78 | 7 | 1.516797 |
| 2 | −48.65 | 2 | 1.581437 |
| 3 | −153.19 | 21.87 | |
| 4 | −141.40 | 2 | 1.516797 |
| 5 | 325.05 | 29.05 | |
| 6 | ∞ | 37.18 | 1.620037 (np1) |
| 7 | ∞ | 0.80 | |
| 8 | ∞ | 58.58 | 1.568830 |
| 9 | ∞ | 54.37 | |
| 10 | ∞ | 4.89 | |
| 11 | −55.65 | 1.60 | 1.784713 |
| 12 | 32.76 | 3 | |
| 13 | ∞ | 5.50 | 1.620407 |
| 14 | −26.14 | 0.40 | |
| 15 | 43.42 | 5.70 | 1.696800 |
| 16 | −43.42 | 0.40 | |
| 17 | 24.76 | 8.50 | 1.696800 |
| 18 | −24.76 | 1.60 | 1.784713 |
| 19 | ∞ | | |

L (mm) = 61.92
ω (°) = 3
fo (mm) = 192.09
fo1 (mm) = 108.90
L/fo − n sin ω = 0.270
fo1/fo = 0.567
D' (mm) = 32
D'/2L + tan ω = 0.311

In this embodiment, the angle θ equals 47° and the refractive index np1 of the first prism 31 equals 1.620037. As is apparent from comparing these values to the Conditions (1)–(5), this embodiment satisfies each of the Conditions (1)–(5).

Embodiment 2

As mentioned above, FIG. 2 shows the general lens element configuration for this embodiment as well.

Table 2 below lists the surface number #, in order from the object side, the radius of curvature R (in mm) of each surface, the on-axis spacing D (in mm) between surfaces, as well as the index of refraction $N_d$ (at the d-line, i.e., λ=587.6 nm) of each optical element of the optical instrument for observation of Embodiment 2. In the bottom portion of the table are listed various values that relate to Conditions (1)–(5) above.

TABLE 2

| # | R | D | $N_d$ |
|---|---|---|---|
| 1 | 86.12 | 7 | 1.516797 |
| 2 | −56.32 | 2 | 1.581437 |
| 3 | −224.13 | 28.25 | |
| 4 | −281.80 | 2 | 1.516797 |
| 5 | 486.51 | 28.49 | |
| 6 | ∞ | 37.18 | 1.620037 (np1) |
| 7 | ∞ | 0.80 | |
| 8 | ∞ | 58.58 | 1.568830 |
| 9 | ∞ | 47.37 | |
| 10 | ∞ | 4.89 | |
| 11 | −55.65 | 1.60 | 1.784713 |
| 12 | 32.76 | 3 | |
| 13 | ∞ | 5.50 | 1.620407 |

TABLE 2-continued

| # | R | D | $N_d$ |
|---|---|---|---|
| 14 | −26.14 | 0.40 | |
| 15 | 43.42 | 5.70 | 1.696800 |
| 16 | −43.42 | 0.40 | |
| 17 | 24.76 | 8.50 | 1.696800 |
| 18 | −24.76 | 1.60 | 1.784713 |
| 19 | ∞ | | |

L (mm) = 67.74
ω (°) = 3
fo (mm) = 192.07
fo1 (mm) = 135.29
L/fo − sinω = 0.300
fo1/fo = 0.704
D' (mm) = 32
D'/2L + tanω = 0.289

In this embodiment, the angle θ equals 47° and the refractive index np1 of the first prism 31 equals 1.620037. As is apparent from comparing these values to the Conditions (1)–(5), this embodiment also satisfies each of the Conditions (1)–(5) so as to prevent ghost images and provide a compact optical instrument for observation.

The invention being thus described, it will be obvious that the same may be varied in many ways. For example, values of the radii of curvature R, the on-axis surface spacings D, and the refractive index $N_d$ of the lens components are not limited to the values shown in the above numerical embodiments, as other values can be used. Furthermore, the number of lens components and lens elements in the objective lens 10 and the ocular lens 20 and their power distribution are also not limited to those shown in the above embodiments, as other constructions can be used. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An optical instrument for observation comprising, in order from the object side:

an objective lens system having positive refractive power;

an erecting optical system; and an ocular lens system having positive refractive power;

wherein an anti-vibration mechanism is used to maintain the erecting optical system at an orientation in space that is stabilized so as to prevent image degradation due to vibrations of the optical instrument for observation; and the erecting optical system is an erecting prism that is constructed so as to satisfy the following Condition (1):

$$0.25 < L/fo - \sin \omega < 0.5 \qquad \text{Condition (1)}$$

where

L is the distance from the lens element surface nearest the object side of the objective lens system to the erecting prism, fo is the focal length of the objective lens system, and ω is the maximum angle of rotation of the erecting prism relative to the optical axis of the optical instrument for observation in order to maintain the spatial orientation of the erecting prism substantially constant in space when correcting for sudden changes in orientation of the optical axis.

2. The optical instrument for observation according to claim 1, wherein the erecting optical system includes, in order from the object side, a first prism and a second prism, and the following Conditions (2) and (3) are satisfied:

$$\theta \geq 47° \qquad \text{Condition (2)}$$

$$np1 \geq 1.6 \qquad \text{Condition (3)}$$

where

θ is the apex angle of the first prism as measured between the first incident surface of light entering the prism and the next surface the light is incident upon; and np1 is the index of refraction of the first prism.

3. The optical instrument for observation according to claim 1, wherein the objective lens system is formed of, in order from the object side, a positive first lens group and a negative second lens group, and the following Condition (4) is satisfied:

$$0.5 < fo1/fo < 0.9 \qquad \text{Condition (4)}$$

where fo is the focal length of the objective lens system, and fo1 is the focal length of the first lens group of the objective lens system.

4. The optical instrument for observation according to claim 2, wherein the objective lens system is formed of, in order from the object side, a positive first lens group and a negative second lens group, and the following Condition (4) is satisfied:

$$0.5 < fo1/fo < 0.9 \qquad \text{Condition (4)}$$

where fo is the focal length of the objective lens system, and fo1 is the focal length of the first lens group of the objective lens system.

5. The optical instrument for observation according to claim 3, wherein the second lens group, in order from the object side, of the objective lens system is constructed so as to be movable along the optical axis for focus adjustment.

6. The optical instrument for observation according to claim 4, wherein the second lens group, in order from the object side, of the objective lens system is constructed so as to be movable along the optical axis for focus adjustment.

7. An optical instrument for observation that comprises, in order from the object side:

an objective lens system of positive refractive power that is formed of, in order from the object side, a positive first lens group and a negative second lens group;

an erecting prism; and an ocular lens of positive refractive power;

wherein said erecting prism includes, in order from the object side, a first prism and a second prism, and the following Conditions (2) through (4) are satisfied $$\theta \geq 47° \qquad \text{Condition (2)}$$

$$np1 \geq 1.6 \qquad \text{Condition (3)}$$

$$0.5 < fo1/fo < 0.9 \qquad \text{Condition (4)}$$

where

θ is the apex angle of the first prism as measured between the first incident surface of light entering the prism and the next surface the light is incident upon;

np1 is the index of refraction of the first prism;

fo is the focal length of the objective lens system, and fo1 is the focal length of the first lens group of the objective lens system.

* * * * *

UNITED STATES PATENT AND TRADEMARK OFFICE
CERTIFICATE OF CORRECTION

PATENT NO.    : 6,795,247 B2
DATED         : September 21, 2004
INVENTOR(S)   : Nagatoshi It is certified that error appears in the above-identified patent and that said Letters Patent is hereby corrected as shown below:

Column 5,
Line 24, change "roof prism 61." to -- by roof prism 61. --;
Line 33, change "erecting prim" to -- erecting prism --;

Column 8,
Line 30, change "nsinω" to -- sin ω --;
Line 33, change "tanω" to -- tan ω --;

Column 9,
Line 14, change "sinω" to -- sin ω --; and
Line 17, change "tanω" to -- tan ω --.

Signed and Sealed this

Eleventh Day of January, 2005

JON W. DUDAS
*Director of the United States Patent and Trademark Office*